US009941551B2

(12) United States Patent
Nenninger et al.

(10) Patent No.: US 9,941,551 B2
(45) Date of Patent: Apr. 10, 2018

(54) TOUCH SENSOR ELEMENT FOR DETECTING CRITICAL SITUATIONS IN A BATTERY CELL

(71) Applicant: Robert Bosch GmbH, Stuttgart (DE)

(72) Inventors: Gero Nenninger, Marbach am Neckar (DE); Anselm Berg, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 52 days.

(21) Appl. No.: 14/571,398

(22) Filed: Dec. 16, 2014

(65) Prior Publication Data

US 2015/0171483 A1   Jun. 18, 2015

(30) Foreign Application Priority Data

Dec. 18, 2013   (DE) .................. 10 2013 226 475

(51) Int. Cl.

| | | |
|---|---|---|
| *H01M 10/42* | (2006.01) | |
| *H01M 10/04* | (2006.01) | |
| *H01M 10/48* | (2006.01) | |
| H01M 10/0525 | (2010.01) | |
| H01M 10/0587 | (2010.01) | |

(52) U.S. Cl.
CPC ... *H01M 10/4257* (2013.01); *H01M 10/0431* (2013.01); *H01M 10/4235* (2013.01); *H01M 10/48* (2013.01); *H01M 10/0525* (2013.01); *H01M 10/0587* (2013.01)

(58) Field of Classification Search
CPC .......................... H01M 10/4257; H01M 10/48
See application file for complete search history.

(56) References Cited

U.S. PATENT DOCUMENTS

| | | | |
|---|---|---|---|
| 6,819,316 B2 | 11/2004 | Schulz et al. | |
| 8,405,629 B2 * | 3/2013 | Reinfried | G06F 3/044 |
| | | | 345/173 |
| 8,425,792 B2 * | 4/2013 | Zu | B82Y 10/00 |
| | | | 216/11 |
| 8,542,215 B2 * | 9/2013 | Hanauer | G06F 3/0416 |
| | | | 345/173 |
| 9,295,176 B2 * | 3/2016 | Ohtani | G06F 3/041 |
| 2008/0100586 A1 * | 5/2008 | Smart | G06F 3/0418 |
| | | | 345/173 |
| 2009/0086397 A1 | 4/2009 | Tan et al. | |
| 2011/0195284 A1 | 8/2011 | Yasui et al. | |
| 2013/0323554 A1 * | 12/2013 | Heubner | H01M 10/48 |
| | | | 429/91 |

FOREIGN PATENT DOCUMENTS

| | | |
|---|---|---|
| DE | 202004006598 | 8/2005 |
| DE | 102011053701 | 5/2012 |
| DE | 102011108803 | 1/2013 |
| DE | 102012208509 | * 11/2013 |
| JP | 2010015914 | 1/2010 |

* cited by examiner

*Primary Examiner* — Ula C Ruddock
*Assistant Examiner* — Thomas H. Parsons
(74) *Attorney, Agent, or Firm* — Michael Best & Friedrich LLP

(57) ABSTRACT

A battery cell, in particular a lithium-ion battery cell, is described, which comprises a negative electrode (25), a separator (24) and a positive electrode (23), wherein the battery cell has a touch sensor element (1) for detecting elements resting on the touch sensor element (1) or exerting pressure on the touch sensor element (1).

19 Claims, 5 Drawing Sheets

TOUCH SENSOR ELEMENT FOR DETECTING CRITICAL SITUATIONS IN A BATTERY CELL

BACKGROUND OF THE INVENTION

The present invention relates to a battery cell, in particular a lithium-ion battery cell, which has a touch sensor element for detecting elements resting on the touch sensor element or exerting pressure on the touch sensor element, and to a method for operating the touch sensor element.

A battery cell is an electrochemical energy store which converts the chemical energy stored into electrical energy by virtue of an electrochemical reaction when it discharges. New battery systems which are subject to very stringent requirements in respect of reliability, safety, performance and life, will be used in the future both in stationary applications such as wind turbines, in motor vehicles, which are configured as hybrid or electric motor vehicles, and in electronic appliances.

Owing to their high energy density, in particular lithium-ion batteries are used as energy stores for electrically driven motor vehicles.

DE202004006598 U1 discloses a touch-sensitive display apparatus (touchscreen) comprising a display unit, in particular a screen, and a sensor element comprising a touch-sensitive surface, wherein the sensor element, when touched, outputs information signals with respect to the touch position to a control apparatus.

DE102011108803 A1 discloses a plastic film with electrical conductors arranged thereon which are electrically insulated from one another but are capacitively coupled at points of intersection for an input apparatus, which links in particular a touch module and an operating element.

U.S. Pat. No. 6,819,316 B2 discloses a flexible, capacitive touch sensor which comprises a thin, flexible, transparent and insulating substrate. A thin, flexible and transparent layer consisting of a resistant material is applied to one side of the substrate, and a thin, flexible, transparent and pressure-sensitive layer consisting of an adhesive material, which is in turn covered by a protective film, is located on the other side of the substrate. The layer consisting of the resistant material comprises integrated electrodes, electrical lines and electrically conductive regions.

SUMMARY OF THE INVENTION

The invention provides a battery cell comprising an integrated touch sensor element for detecting elements resting on a touch sensor element or exerting pressure on the touch sensor element and a method for operating said battery cell.

This is based in particular on the fact that the touch sensor element detects elements which rest on said touch sensor element or exert pressure on said touch sensor element, such as pointed objects which enter the battery cell, deformations of the battery cell which arise owing to impacts or accidents, for example, and which result in an increased local pressure at the corresponding points of the battery cell. Furthermore, the touch sensor element detects events such as, for example, the battery cell being dropped, or the battery cell being subject to a shock or impacts or the like by detecting a locally increased pressure at the corresponding points. In addition, elements such as, for example, free particles and chemical elements which accumulate on the touch sensor element are detected by said touch sensor element.

It is advantageous here that the state of the battery cell is monitored with the aid of the touch sensor element, as a result of which in particular critical situations, such as, for example, those mentioned above, are identified. By virtue of early detection of critical situations, measures for eliminating the critical situation are initiated promptly. Thus, for example, further damage to the battery cell and premature aging thereof owing to critical conditions in the battery cell or a short circuit of the battery cell can be prevented. In addition, the manufacture of such a touch sensor element is simple and inexpensive.

It is furthermore advantageous that, in contrast to the use of sensors such as, for example, acceleration sensors, in which an acceleration is identified but it is necessary to detect, by means of complex software, whether the acceleration is damaging or undamaging, the determined position of the touch or exertion of pressure on the touch sensor element can be used directly as trigger for a further circuit, for example for initiating safety-relevant actions.

It is advantageous if, in one embodiment, the touch sensor element is integrated in a film of the battery cell since, firstly, a film is thin, for which reason it can be located in a space-saving manner at different points in the battery cell, and secondly it is flexible, with the result that the film and the integrated touch sensor element can compensate for mechanical effects, such as impacts, for example, by virtue of its flexibility and does not break. In addition, it is possible to implement the film with an integrated touch sensor element in various forms, for example in wound form, without said film being damaged.

In a further advantageous embodiment, the touch sensor element is in the form of a capacitive sensor element. In the case of capacitive sensor elements, no mechanical pressure acting on the touch sensor element is required in order to be detected by said touch sensor element. Only as a result of the touch sensor element being touched by an electrically conductive element, for example even by lithium ions, does the electrical field within the touch sensor element change, which results in a measurable electrical pulse. One advantage with capacitive sensor elements is the fact that elements which only rest on the touch sensor element but do not exert any pressure thereon are detected since such elements can pose a potential risk, but cannot be detected by all touch sensor elements. A further advantage consists in that capacitive sensor elements are very precise. In addition, they are resistant to chemicals and very insensitive to mechanical damage. In accordance with one embodiment, it is further advantageous to apply the conductor tracks of the touch sensor element which are arranged in the form of a grid to the film by means of a printing method, since such a method is comparatively inexpensive and saves time.

It is advantageous to use conductor tracks consisting of copper and/or silver since such conductor tracks have a high electrical and thermal conductivity. In addition, copper is very stable.

Furthermore, it is advantageous if the conductor tracks have a diameter of approximately 1-25 nm since, with this order of magnitude, they do not represent a notable additional weight in the battery cell. The smaller the diameter of the conductor tracks, the more flexible the touch sensor element is, for example in respect of the winding of a film in which the touch sensor element is integrated.

In a further advantageous embodiment, the touch sensor element is in the form of a resistive sensor element. Resistive touch sensor elements are comparatively inexpensive, very precise and in addition relatively insensitive to moisture. In this case, four-wire, five-wire, six-wire, seven-wire or eight-wire technology can be used, wherein the four-wire technology is the simplest of the mentioned technologies.

In a particularly advantageous embodiment, the touch sensor element is integrated in a separator film of a battery cell. Thus, the touch sensor element can detect elements which rest directly on the separator film or exert pressure thereon. Such elements are, for example, particles which ingress into the battery cell during manufacture of said battery cell. In addition, dendrites which are formed, for example, starting from an anode up to the separator and pose the risk of breaking through the separator when not identified in good time, which usually results in a short circuit, can be identified by the touch sensor element. One advantage with early detection of such risks by a touch sensor element integrated in the separator film consists in that measures for eliminating critical situations can be initiated in good time. Thus, damage to the battery cell or possibly a short circuit can be avoided. In addition, the functionality and life of the battery cell are thus extended.

It is furthermore advantageous that no further film needs to be integrated in the battery cell, but the touch sensor element can merely be integrated in the already existing separator film.

In a further particularly advantageous embodiment, the touch sensor element is integrated in a cell coil film, which surrounds a negative electrode, the separator and a positive electrode of the battery cell. Thus, the touch sensor element can detect elements which rest directly on the cell coil film or exert pressure thereon. The advantage here consists in that all mechanical effects which act on component parts which are integrated in the cell coil film are identified. Monitoring of the component parts of the battery cell within the cell coil film is therefore more accurate and more precise than with conventional methods for monitoring a battery cell. Thus, damage to the battery cell or possibly a short circuit can be avoided. In addition, the functionality and life of the battery cell are extended in this way.

It is furthermore advantageous that no further film needs to be integrated in the battery cell, but the touch sensor element can merely be integrated in the already existing cell coil film.

In an advantageous embodiment, the touch sensor element is connected to evaluation electronics and a unit for initiating safety-relevant actions. In this case, the evaluation electronics and/or the unit for initiating safety-relevant actions can be integrated in an additional film of the battery cell. The film can be located, for example, on the inner side of a housing of a battery cell, in particular on the inner side of a cover of the housing or can be in direct physical contact with the composite arrangement comprising the positive electrode, the separator and the negative electrode of the battery cell. One advantage here consists in the much smaller amount of space required for the evaluation electronics and/or the unit for initiating safety-relevant actions in comparison with alternative concepts, such as, for example, the integration of electronics in the form of component parts such as, for example, printed circuit boards in the battery cell itself. Likewise, the costs are much lower in comparison with alternative concepts. In addition, films can be processed in a continuous process, as a result of which savings are made in respect of time and costs. The evaluation electronics and/or unit for initiating safety-relevant actions integrated in a film is/are flexible and can be electrically insulated, with the result that it/they can be applied/introduced into any desired housing component parts, for example even directly into the cell coil film of the battery cell.

BRIEF DESCRIPTION OF THE DRAWINGS

Embodiments of the present invention are illustrated in the drawing and explained in more detail in the description of the figures below, in which.

DETAILED DESCRIPTION

Figure 1:
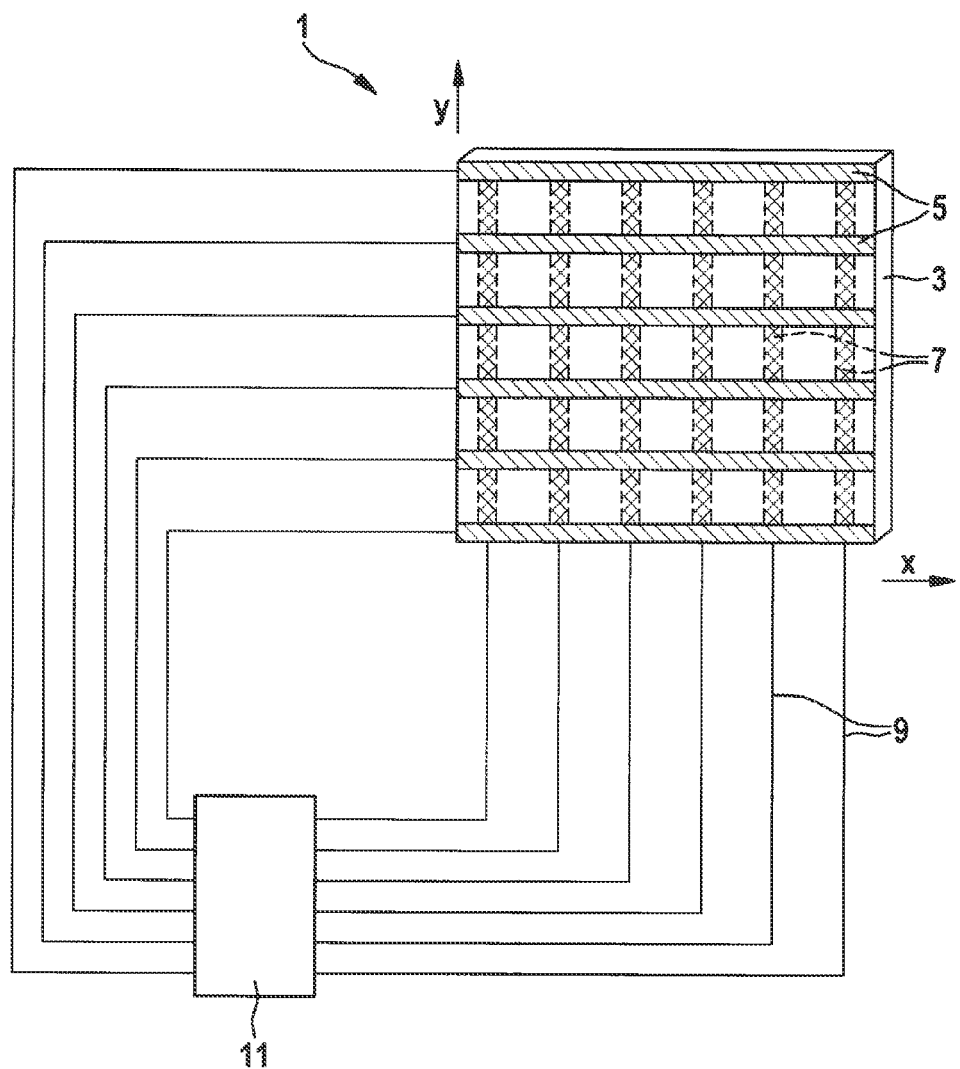
FIG. 1 shows the schematic illustration, from the front, of a projected-capacitive touch sensor element comprising conductor tracks arranged in the form of a grid.

FIG. 1 shows a conventional projected-capacitive touch sensor element 1, which is a possible variant of capacitive touch sensor elements 1 in which changes in capacitance as a result of touching contact are detected over two different levels with a conductive pattern. The touch sensor element 1 comprises a conductive grid structure of first conductor tracks 5, 7, for example consisting of copper, silver or indium-tin oxide, wherein the first conductor tracks 5 arranged parallel to one another and pointing in the x direction are applied to the upper side of a substrate 3, for example, and the second conductor tracks 7 arranged parallel to one another and oriented in the y direction are applied to the lower side of the substrate 3. The conductor tracks 5, 7 are electrically insulated from one another. The first conductor tracks 5 oriented in the x direction and applied to the upper side of the substrate 3 act as sensor, for example, while the second conductor tracks 7 applied to the lower side of the substrate 3 and oriented in the y direction act as drivers, for example. The conductor tracks 5, 7 are connected to a control unit 11 via connecting lines 9. AC voltage is applied to the second conductor tracks oriented in the y direction via the control unit 11, for example, as a result of which a capacitive coupling between the second conductor tracks 7 oriented in the y direction and the first conductor tracks 5 oriented in the x direction is produced. A protective layer 17 (not illustrated), for example a film, is applied to the substrate 3 with the conductor tracks 5, 7 applied to the upper and lower sides. When a conductive object 19 touches the protective layer 17, a change in capacitance takes place, and this change in capacitance is used to calculate the coordinates of the point of touch via evaluation electronics which can be integrated in the control unit 11, for example.

The conductor tracks 5, 7 can be printed on or applied to the substrate 3 by means of galvanic methods, for example.

There are further variants of capacitive touch sensor elements 1, with different modes of operation. These variants are likewise included in the context of the present invention.

A conductive object merely coming close can also result in a change in capacitance in the case of capacitive touch sensor elements 1. Where mention is made of a change in capacitance as a result of touching, this is also intended to mean a change in capacitance as a result of a conductive object getting close.

Figure 2:
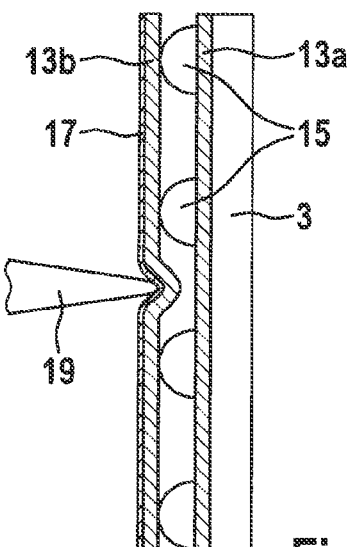
FIG. 2 shows the schematic illustration, from the side, of a resistive touch sensor element of a battery cell according to the invention with an object exerting pressure thereon.

FIG. 2 shows a conventional resistive touch sensor element 1, which comprises two conductive layers 13a, 13b consisting of indium-tin oxide arranged parallel to one another. The conductive layers 13a, 13b are separated from one another by insulating spacer elements 15. The first conductive layer 13a is applied to a substrate 3, the second conductive layer 13b is covered by a protective layer 17, for example a plastic film. A voltage is applied to the conductive layers 13a, 13b so that, for example, a voltage gradient in the x direction is present on the first conductive layers 13a and a voltage gradient in the y direction is present on the second conductive layer 13b. If, for example, pressure is exerted on the touch sensor element 1 by an object 19, for example by a dendrite, the second conductive layer 13b is pressed onto the first conductive layer 13a, as a result of which an electrical contact is produced which changes the voltage of the conductive layers 13a, 13b at this point. By measuring the change in the electrical resistance depending on the voltage gradient in the x direction and y direction, the coordinates of the point of pressure are calculated by evaluation electronics (not illustrated).

In order to operate a resistive touch sensor element 1, various technologies can be used. Four-wire technology is the simplest technology, in which the voltage is applied alternately to the two conductive layers 13 with in each case a different orientation. With this technology, four connection wires are each applied in pairs to the upper and lower conductive layer.

In the case of five-wire technology, four connection wires are connected in each case to the corners of the lower conductive layer 13. The upper conductive layer 13 is used for tapping off the voltage via an additional fifth connection wire.

Six-wire and seven-wire technologies are variations of the five-wire technology, while eight-wire technology is a variation of four-wire technology. With these technologies, additional connection wires are used to tap off the measured voltages not on the feed line but over separate measuring lines.

Figure 3A:
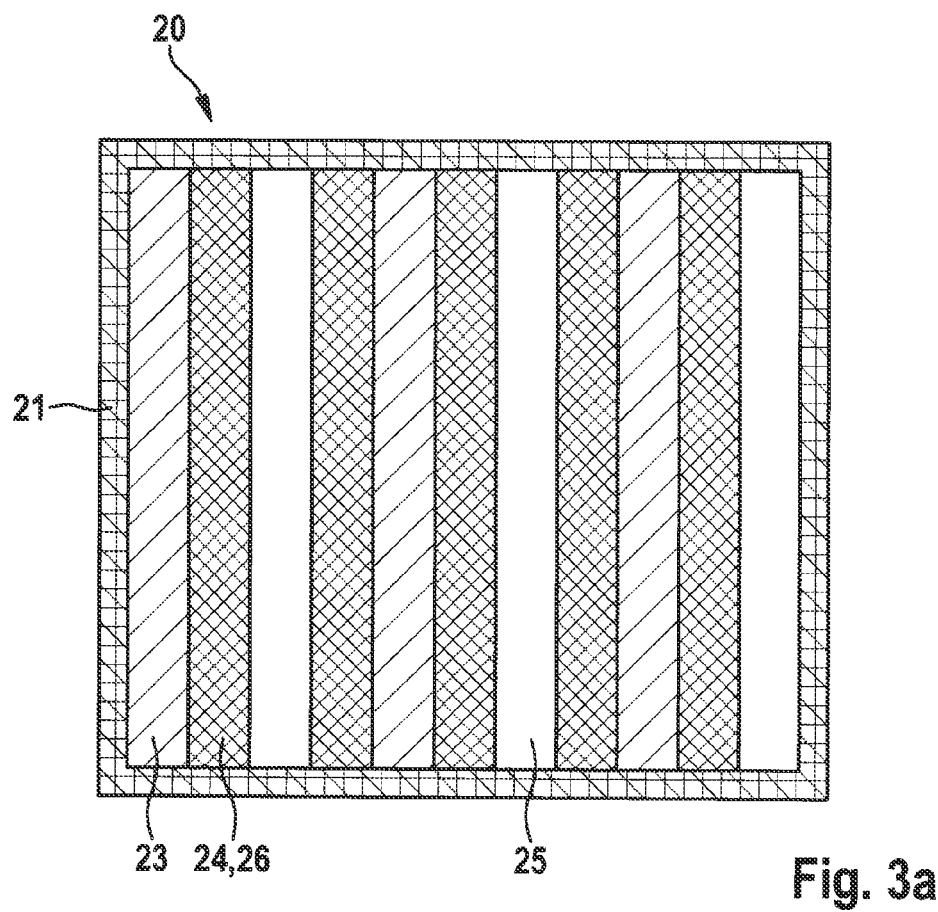
FIG. 3a shows the schematic illustration of a composite arrangement of a battery cell according to the invention comprising a positive electrode, a separator and a negative electrode, which, in accordance with a first embodiment of the invention, are surrounded by a cell coil film with an integrated touch sensor element.

FIG. 3a shows a schematic illustration of a composite arrangement 20 of a battery cell in accordance with a first embodiment, comprising a negative electrode 25, a separator 24 and a positive electrode 23, which are surrounded by a cell coil film 21. A touch sensor element 1 is integrated in the cell coil film 21. Elements which rest directly on the cell coil film 21 with integrated touch sensor element 1 or exert pressure thereon are detected by the touch sensor element 1.

Figure 3B:
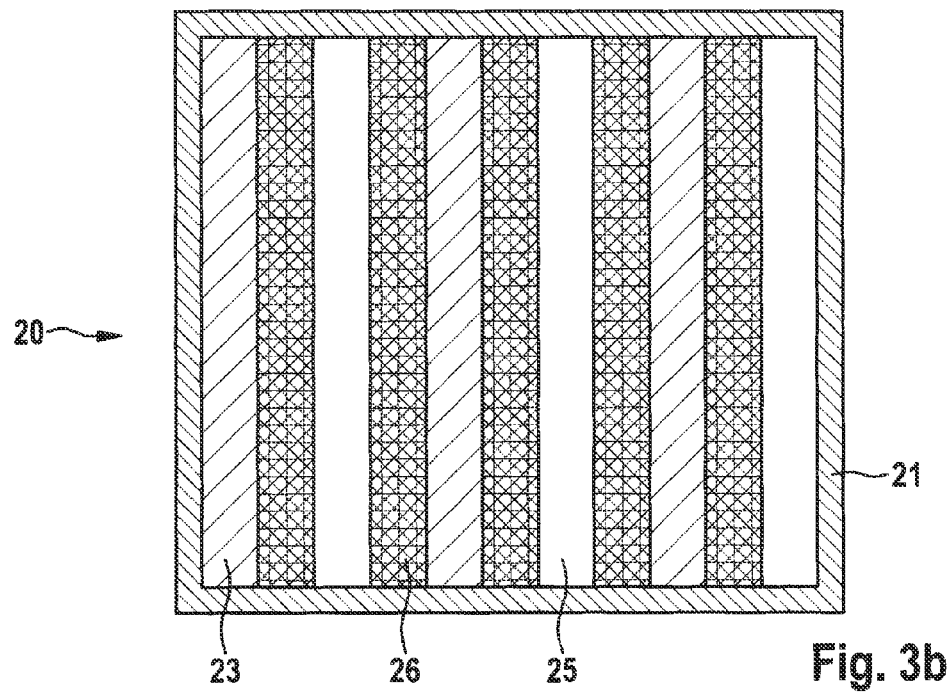
FIG. 3b shows the schematic illustration of a composite arrangement of a battery cell according to the invention comprising a positive electrode, a separator and a negative electrode, which are surrounded by a cell coil film, and wherein, in accordance with a first variant of a second embodiment of the invention, a touch sensor element is integrated in the separator.

FIG. 3b shows a schematic illustration of a composite arrangement 20 of a battery cell in accordance with a first variant of a second embodiment, comprising a negative electrode 25, a separator 24 and a positive electrode 23, which are surrounded by a cell coil film 21. In this case, the separator 24 is embodied as a separator film 26, in which a touch sensor element 1 is integrated. Elements which rest directly on the separator film 26 with the integrated touch sensor element 1 or exert pressure thereon are detected by the touch sensor element 1.

Figure 3C:
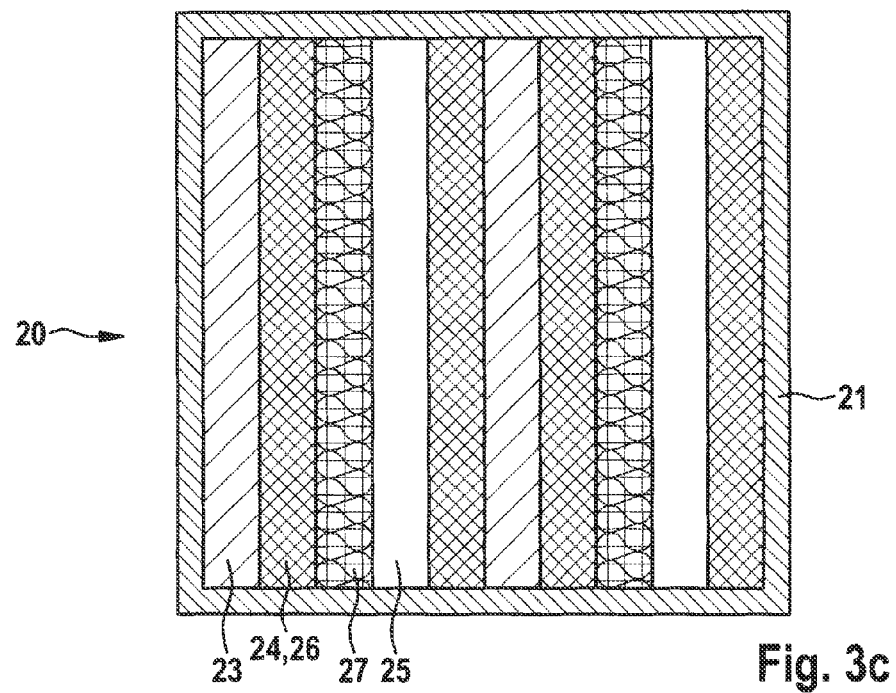
FIG. 3c shows the schematic illustration of a composite arrangement of a battery cell according to the invention comprising a positive electrode, a separator, a negative electrode and a further film with an integrated touch sensor element in accordance with a second variant of the second embodiment of the invention, wherein the composite arrangement is surrounded by a cell coil film and wherein the further film is arranged between the separator and the negative electrode.

FIG. 3c shows the schematic illustration of a composite arrangement 20 of a battery cell in accordance with a second variant of the second embodiment of the invention, comprising a positive electrode 23, a separator 24, a negative electrode 25 and a further film 27 with integrated touch sensor element 1, wherein said composite arrangement is surrounded by a cell coil film 21. The further film 27 with the integrated touch sensor element 1 is arranged between the separator 24 and the negative electrode 25. Elements which rest directly on the further film 27 with integrated touch sensor element 1 or exert pressure thereon are detected by the touch sensor element 1.

Figure 3D:
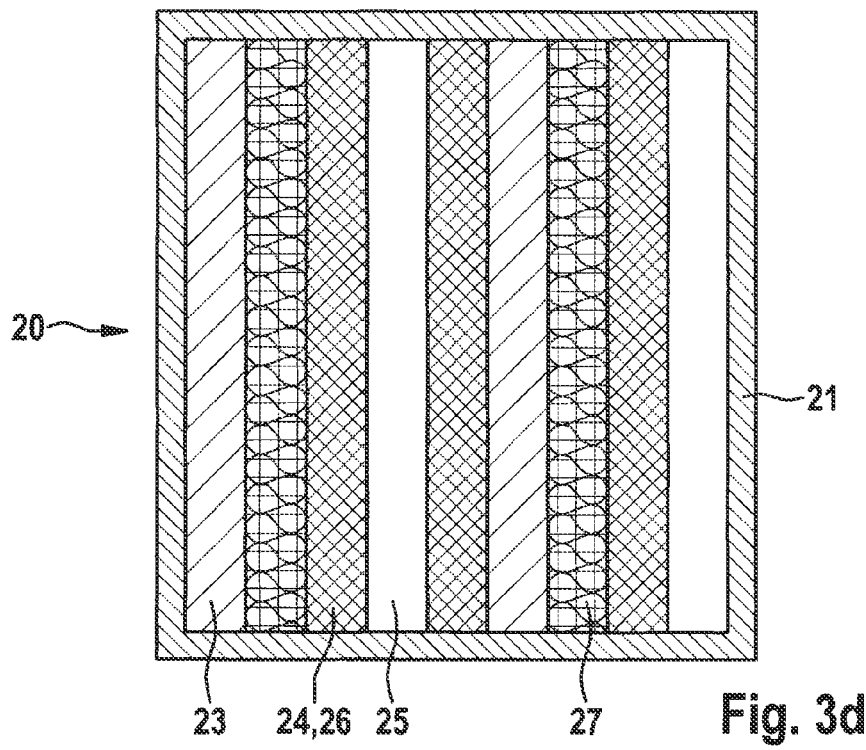
FIG. 3d shows the schematic illustration of a composite arrangement of a battery cell according to the invention comprising a positive electrode, a separator, a negative electrode and a further film with an integrated touch sensor element in accordance with a third variant of the second embodiment of the invention, wherein the composite arrangement is surrounded by a cell coil film, and wherein the further film is arranged between the separator and the positive electrode.

FIG. 3d shows the schematic illustration of a composite arrangement 20 of a battery cell in accordance with a third variant of the second embodiment of the invention, comprising a positive electrode 23, a separator 24, a negative electrode 25 and a further film 27 with integrated touch sensor element 1, wherein said composite arrangement 20 is surrounded by a cell coil film 21. The further film 27 with integrated touch sensor element 1 is arranged between the separator 24 and the positive electrode 23. Elements which rest directly on the further film 27 with integrated touch sensor element 1 or exert pressure thereon are detected by the touch sensor element 1.

Figure 3E:
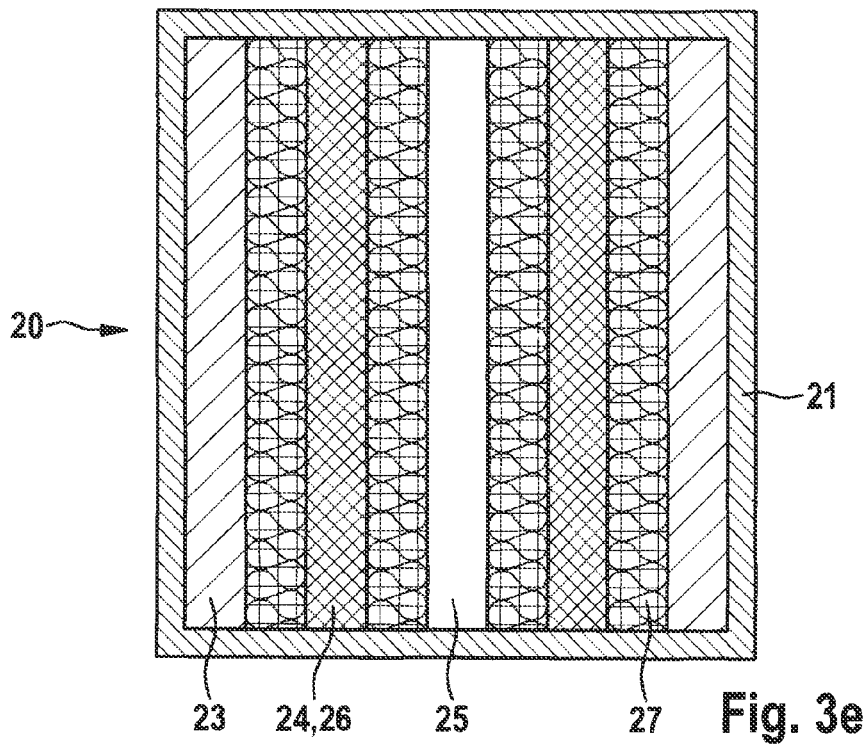
FIG. 3e shows the schematic arrangement of a composite arrangement of a battery cell according to the invention comprising a positive electrode, a separator, a negative electrode and further films with an integrated touch sensor element in accordance with a fourth variant of the second embodiment of the invention, wherein the composite arrangement is surrounded by a cell coil film, and wherein the further films are arranged between the separator and the positive electrode and between the separator and the negative electrode.

FIG. 3e shows the schematic illustration of a composite arrangement 20 of a battery cell in accordance with a fourth variant of the second embodiment of the invention, comprising a positive electrode 23, a separator 24, a negative electrode 25 and two further films 27, in which in each case one touch sensor element 1 is integrated, wherein the composite arrangement is surrounded by a cell coil film 21.

The further films 27 are arranged between the separator 24 and the positive electrode 23 and between the separator 24 and the negative electrode 25. Elements which rest directly on the further films 27 with integrated touch sensor element 1 or exert pressure thereon are detected by the touch sensor element 1.

In the battery cells according to the invention with an integrated touch sensor element, the corresponding films can comprise resistive or capacitive touch sensor elements 1, for example.

Elements which rest directly on the films 21, 26, 27 with integrated touch sensor element 1 or exert pressure thereon are detected by the touch sensor element 1. Such elements may be, for example, pointed objects which enter the battery cell, such as a needle, for example. Furthermore, deformations of the battery cell, for example as a result of impacts, can possibly result in an elevated local pressure on the corresponding points of the film 21, 26, 27 with integrated touch sensor element 1. In addition, elements such as free particles, for example, which are located within the composite arrangement 20 or move into critical positions as a result of vibrations, external acceleration or intercalation movements of the components within the composite arrangement 20 exert pressure on the film 21, 26, 27 with integrated touch sensor element 1 during the charging cycle.

Furthermore, metal deposits such as dendrites, for example, which are deposited on the film 21, 26, 27 with integrated touch sensor element 1 are also detected.

In the case of lithium-ion battery cells, dendrite growth may take place, for example, when the anode is overcharged. Even in the case of new lithium batteries which use lithium alloys or lithium metal as anode material, for example, porous dendritic deposits of lithium may occur during charging, which deposits grow perpendicular to the anode as dendrites on the anode and can pass through physically following elements, for example a separator 24 or a separator film 26, when they are not noticed in good time.

In the embodiments described and in the further context, the term separator 24 is also intended to include the possibility of the separator 24 being embodied as a separator film 26.

The components of the composite arrangement 20 of the battery cell, comprising a positive electrode 23, a separator 24, a negative electrode 25 and, depending on the variant of the second embodiment, a further film 27, which are surrounded by the cell coil film 21, can be present both in wound and stacked form.

In the case of wound composite arrangements 20, one or more wound composite arrangements 20 may be present in a battery cell. In this case, the cell coil film 21 can be wound around in each case one composite arrangement 20 or alternatively around several wound composite arrangements 20 of a battery cell together.

In addition, the composite arrangement 20 or the composite arrangements 20 can be located both in a prismatic battery cell in which the housing is formed from metal or plastic, for example, and in a pouch cell.

The touch sensor element 1 is connected to evaluation electronics 35, which determine the position of touch or exertion of pressure on the touch sensor element 1. Furthermore, the touch sensor element 1 can be connected to a unit for initiating safety-relevant actions. The evaluation electronics 35 transmit the evaluated data to a unit for initiating safety-relevant actions, for example, which then, if appropriate, initiates corresponding measures for eliminating the critical situation. Critical situations can arise, for example, as a result of pointed objects which enter the battery cell, particles in the interior of the battery cell or dendrites, which can result in reductions in function, charging errors and, in the worst case scenario, a short circuit of the battery cell.

In order to prevent this, corresponding measures for eliminating such critical situations are initiated, such as, for example, a change to the temperature control of the battery cell, charging and discharge cycles matched to the situation or disconnection of the battery cell.

Figure 4:
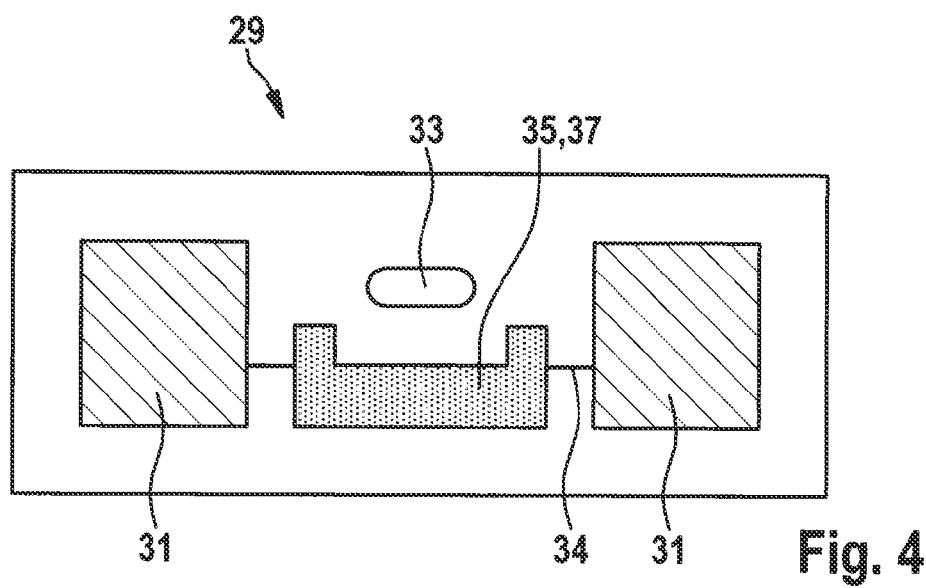
FIG. 4 shows the schematic illustration of a lower side of a housing cover of a battery cell in accordance with one embodiment of the invention, wherein an additional film with integrated evaluation electronics is applied to the housing cover.

FIG. 4 shows the inner side of a housing cover 29 of a battery cell having two outgoing electrical conductors 31 and a safety valve 33. In accordance with a particularly preferred embodiment of the invention, an additional film 37 with integrated evaluation electronics 35 is applied to the inner side of the housing cover 29 of the battery cell, for example by means of adhesive bonding. Said additional film 37 is electrically conductively connected to the two outgoing electrical conductors 31 via a connection piece 34, for example a wire.

The evaluation electronics 35 are electrically insulated, for example. The integration in a film is particularly advantageous for electronic component parts which only require low currents, such as, for example, evaluation electronics 35 for sensor signals or other simple electronic elements. The electronics can be located on the inner side of a housing of the battery cell, in particular on the inner side of a cover of the housing, for example.

In an alternative or additional embodiment, the electronics can be located on the composite arrangement 20 of the battery cell, for example.

Figure 5:
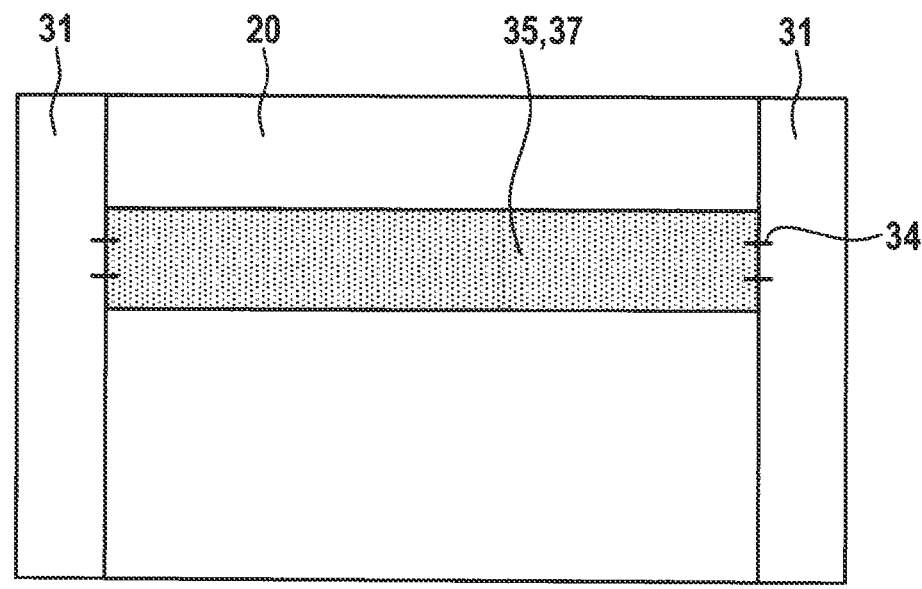
FIG. 5 shows the schematic illustration of a composite arrangement in accordance with a further embodiment of the invention comprising a positive electrode, a separator and a negative electrode, wherein an additional film with integrated evaluation electronics is applied to the composite arrangement.

FIG. 5 shows a composite arrangement 20, comprising a positive electrode 23 (not illustrated), a separator 24 (not illustrated), a negative electrode 25 (not illustrated) and a possible further film 27 (not illustrated). The electrodes 23, 25 are each in contact with the outgoing electrical conductors 31 on the opposite sides. An additional film 37 with integrated evaluation electronics 35 is applied directly to the composite arrangement 20, for example by means of adhesive bonding. The additional film 37 with integrated evaluation electronics 35 is electrically conductively connected to the two outgoing electrical conductors 31 via a connecting piece 34, for example a wire.

Optionally, the additional film 37 with integrated evaluation electronics 35 can be located on the cell coil film which is wound around the composite arrangement 20.

In a further embodiment, the unit for initiating safety-relevant actions is likewise integrated in the additional film 37.

The term "additional film" should not be understood exclusively to mean that an additional film 37 is introduced into the battery cell, but rather this term is also intended to include the integration of electronics in a film 12, 26, 27 already provided in the battery cell.

The films 21, 26, 27 and 37 can be manufactured, for example, from a plastic such as polyethylene, polypropylene, polyvinyl chloride, for example.

What is claimed is:

1. A battery cell comprising a negative electrode (25), a separator (24), and a positive electrode (23), wherein the battery cell has a touch sensor element (1) for detecting elements resting on the touch sensor element (1) or exerting pressure on the touch sensor element (1), wherein the separator (24) is positioned between the negative electrode (25) and the positive electrode (23), wherein the separator (24) is a separator film (26), and wherein the touch sensor element (1) is integrated in the separator film (26) of the battery cell, characterized in that the touch sensor element (1) is connected to evaluation electronics (35) and a unit for initiating safety-relevant actions, and wherein different coordinates of corresponding points of pressure on the touch sensor element (1) are calculable by the evaluation electronics.

2. The battery cell according to claim 1, characterized in that the touch sensor element (1) is a capacitive sensor element.

3. The battery cell according to claim 2, characterized in that the touch sensor element (1) comprises conductor tracks (5, 7) which are arranged in grid-shaped fashion and which are integrated in the separator film (26).

4. The battery cell according to claim 3, characterized in that the conductor tracks (5, 7) arranged in the form of a grid are printed onto the separator film (26).

5. The battery cell according to claim 3, characterized in that the conductor tracks (5, 7) arranged in the form of a grid comprise copper and/or silver.

6. The battery cell according to claim 3, characterized in that the conductor tracks (5, 7) arranged in the form of a grid have a diameter of 1-25 nm.

7. The battery cell according to claim 1, characterized in that the touch sensor element (1) is a resistive sensor element.

8. The battery cell according to claim 7, characterized in that the touch sensor element (1) comprises two electrically conductive layers (13), which come into contact with one another when there is a pressure acting on said layers such that a position of a point of pressure is determinable on the basis of the resultant change in the electrical resistance.

9. The battery cell according to claim 7, wherein the touch sensor element (1) uses four-wire, five-wire, six-wire, seven-wire or eight-wire technology.

10. The battery cell according to claim 1, wherein the negative electrode (25), separator (240 and the positive electrode (23) are surrounded by a cell coil film (21), characterized in that the touch sensor element (1) is integrated in the cell coil film (21) of the battery cell.

11. The battery cell according to claim 1, characterized in that at least one of the evaluation electronics (35) and the unit for initiating safety-relevant actions is integrated in a film.

12. The battery cell according to claim 11, characterized in that the film is located on an inner side of a housing of the battery cell.

13. The battery cell according to claim 11, characterized in that the film is located on an inner side of a housing cover of the battery cell.

14. The battery cell according to claim 11, characterized in that the film is in physical contact with a composite arrangement (20) comprising the negative electrode (25), the separator (24) and the positive electrode (23).

15. The battery cell according to claim 11, characterized in that the film is in physical contact with a composite arrangement (20) comprising the negative electrode (25), the separator (24) and the positive electrode (23), which are in wound form.

16. A method for operating a battery cell, comprising a negative electrode (25), a separator (24), a positive electrode (23) and a touch sensor element (1) for detecting elements resting on the touch sensor element (1) or exerting pressure on the touch sensor element (1), the method comprising
calculating, via evaluation electronics (35), coordinates of a position of touch or exertion of pressure on the touch sensor element (1); and
transmitting evaluated data, which includes the coordinates, determined by evaluation electronics (35) to a unit for initiating safety-relevant actions.

17. The method for operating a touch sensor element (1) of a battery cell according to claim 16, characterized in that the unit for initiating safety-relevant actions initiates measures for eliminating critical situations.

18. The method for operating a touch sensor element (1) of a battery cell according to claim 16, wherein the separator (24) is positioned between the negative electrode (25) and the positive electrode (23), wherein the separator (24) is a separator film (26), and wherein the touch sensor element (1) is integrated in the separator film (26) of the battery cell.

19. The method for operating a touch sensor element (1) of a battery cell according to claim 16 further comprising:
initiating the safety-relevant actions based at least in part on the evaluated data, which includes the coordinates of the position of touch or exertion of pressure on the touch sensor element (1).

* * * * *